Figure 1:
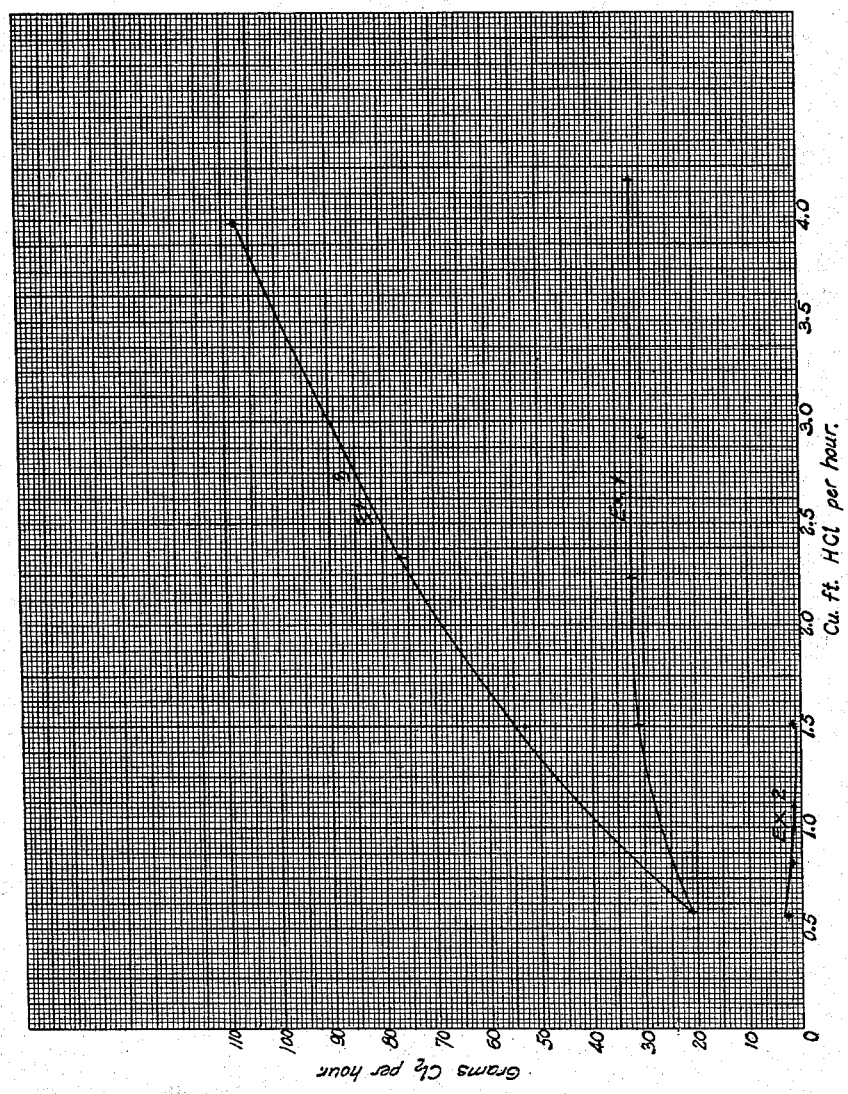

June 18, 1940.  H. S. MILLER  2,204,733
PRODUCTION OF CHLORINE
Filed June 3, 1938    3 Sheets-Sheet 1

INVENTOR
HOKE S. MILLER
BY *Pennie Davis Marvin & Edmonds*
ATTY'S

Patented June 18, 1940

2,204,733

UNITED STATES PATENT OFFICE 2,204,733

PRODUCTION OF CHLORINE

Hoke S. Miller, Stamford, Conn., assignor to Air Reduction Company, Incorporated, New York, N. Y., a corporation of New York Application June 3, 1938, Serial No. 211,521

8 Claims. (Cl. 23—219)

This invention relates to the production of chlorine and particularly to improvements in the method of producing free chlorine by oxidation of hydrogen chloride with air or oxygen.

Commercial chlorine has been produced for many years chiefly by the electrolysis of salt solutions such as aqueous solutions of sodium or potassium chloride. Electrolysis of such solutions produces free chlorine, and at the same time caustic soda or potash. The electrolytic method is economical wherever a use may be found for the caustic soda or potash which is formed inevitably as a byproduct, but where such opportunity to use the byproduct is absent, the electrolytic method cannot be operated advantageously.

The Deacon process which was devised many years ago avoids the byproducts of the electrolytic method. This method depends upon oxidation of hydrogen chloride with air according to the equation:

$$4HCl + O_2 = 2Cl_2 + 2H_2O$$

To carry out this reaction, hydrogen chloride was mixed with air and passed over a catalyst at an elevated temperature. The gas leaving the catalyst contained chlorine and steam, together with unreacted hydrogen chloride and oxygen as well as the diluent nitrogen of the air.

The catalyst used originally in the Deacon process was copper sulphate mounted on a supporting material. Copper chloride was used later with somewhat better results. Other proposed catalysts have been chlorides of magnesium, chromium, nickel, cobalt and iron mounted on various types of carriers. All of the catalysts used or proposed in the Deacon process have been subject to the disadvantages that large quantities of the catalyst must be used to give commercial yields of chlorine and furthermore that the catalyst loses its activity so rapidly as to prevent successful commercial operation. The rapid loss in activity is due in part to the gradual loss of the metal chloride by volatilization at the elevated temperature, 400 to 600° C., required for the operation. The loss was minimized to some extent by a periodic reversal of the direction of flow of the reacting gases without, however, permitting successful commercial operation of the process.

Ditz and Margosches (German Patent No. 150,-226), proposed the use of compounds of the rare earth metals such as their oxides or chlorides or other salts as catalysts for the oxidation of hydrogen chloride. The rare earth metals referred to include metals such as thorium, cerium, lanthanum, praseodymium, neodymium, yttrium, etc. As far as I have been able to ascertain, none of these materials were ever employed commercially.

Although the Deacon process and various modifications thereof were attempted on a large scale, their inherent defects led to their abandonment owing to the fact that they could not be operated economically. In recent years the electrolytic method has remained the only practical commercial process for the production of chlorine. However, in many cases of manufacturing processes there are economic disadvantages in producing chlorine and caustic simultaneously, and the problem of producing chlorine without caustic has remained unsolved.

It is the object of the present invention to provide a simple, efficient and satisfactory method of producing chlorine by direct oxidation of hydrogen chloride.

A further object of the invention is the provision of a catalyst adapted to effect the oxidation of hydrogen chloride with air or oxygen which is efficient and not subject to the disadvantages of catalysts heretofore used or suggested for use in effecting oxidation of hydrogen chloride.

Figure 2:
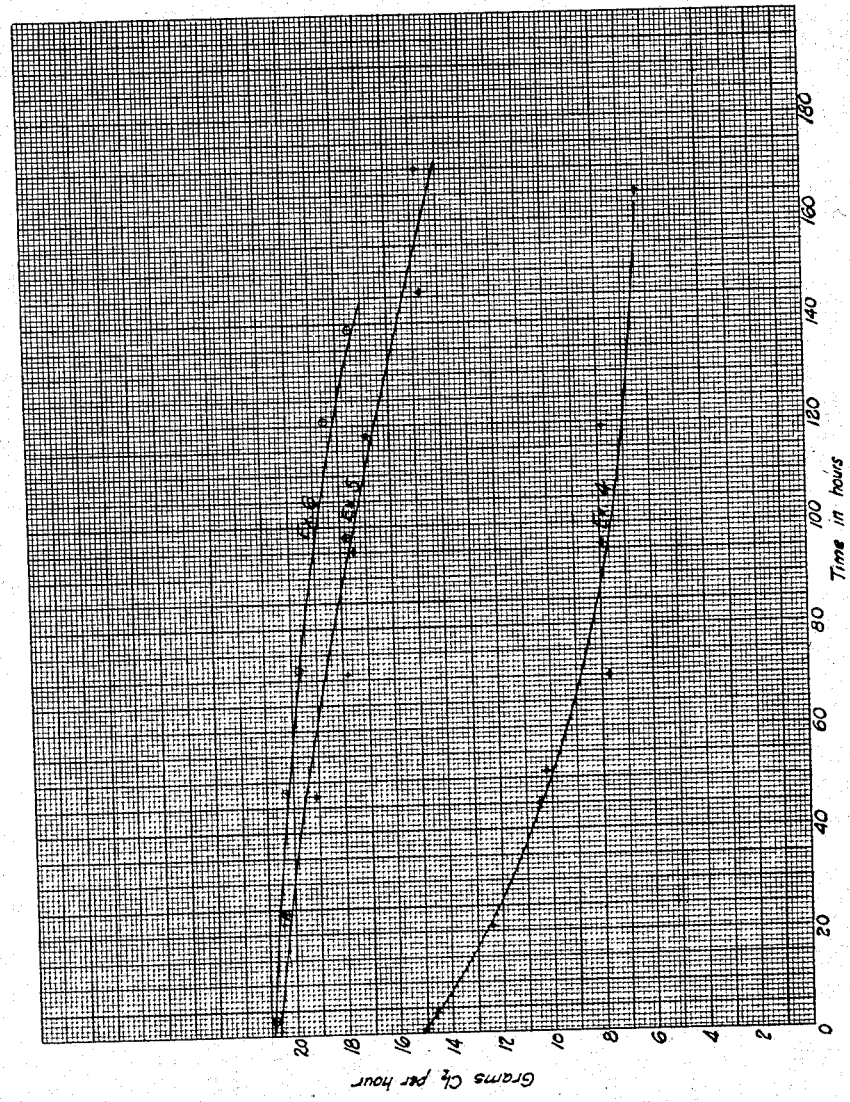
Figure 3:
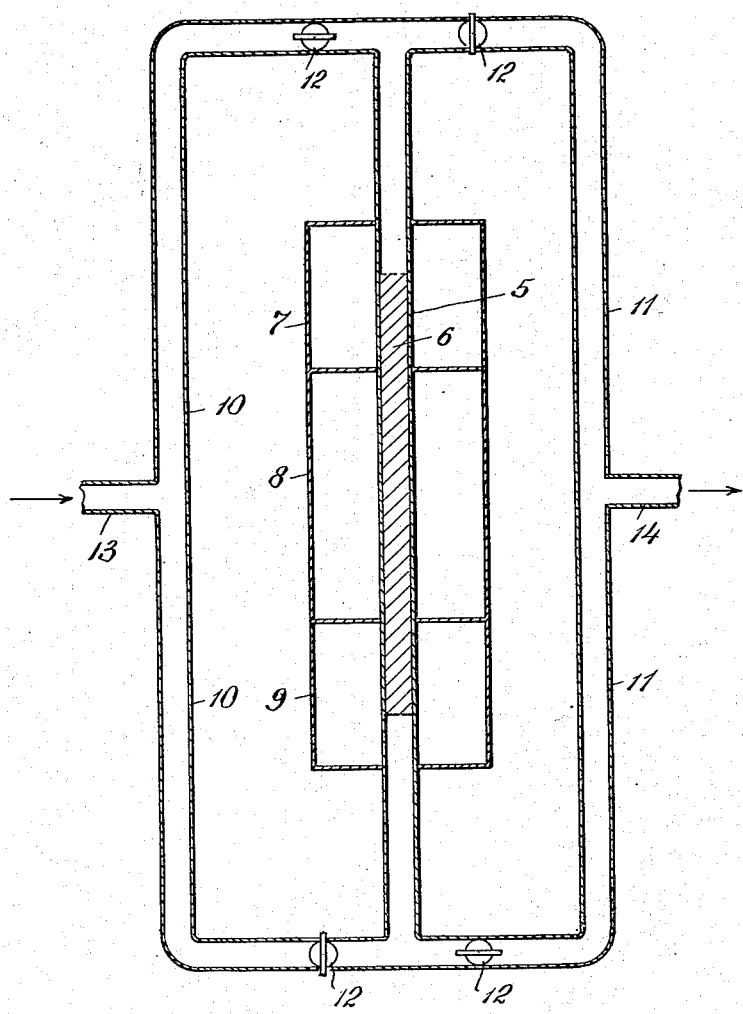

Other objects and advantages of the invention will be apparent as it is better understood by reference to the following specification and accompanying drawings, in which Figs. 1 and 2 are graphic illustrations of the results secured in various operations hereinafter more fully described; and Fig. 3 is a diagrammatic illustration of an apparatus suitable for the practice of the present invention, it being understood that no attempt has been made to illustrate the details of such an apparatus.

I have discovered that the oxidation of hydrogen chloride with air or oxygen and the production of chlorine in commercial quantities and under economic conditions can be accomplished by utilizing as a catalytic material a compound of copper to which has been added a compound of one or more of the group of metals commonly known as the rare earth group or a compound of uranium. By "rare earth group" I mean to include those groups of metals of which the following are examples: scandium, cerium, lanthanum, praseodymium, neodymium, illinium, samarium, thorium, europium, gadolinium, terbium, yttrium, dysprosium, holmium, erbium, thulium, ytterbium, lutecium and zirconium.

The rare earth material may be added to the copper compound as a pure material or as a mixture of rare earth compounds, for example, a compound of thorium or lanthanum may be added to the copper compound or a mixture of cerium and thorium compounds may be used. The possible combinations of such materials is practically limitless, and it is unnecesary for the purpose of explaining the invention to expressly define every one of such possible combinations. In the commercial application of the invention, the materials which can be obtained and utilized most economically will be employed. I prefer to use the mixture of rare earth compounds and associated materials ordinarily obtained from monazite sand, samarskite and other minerals, or the mixture of these materials remaining after the extraction of one or more of the individuals such as thorium or cerium from the minerals.

As is evident, the composition of the catalytic material may be varied within wide limits. Good results have been obtained when the amount of copper compound present is such that the catalyst contains a fraction of one per cent by weight of copper, or the copper content of the catalyst may be increased to 25% by weight or even more. At the same time, the amount of rare earth material added may be varied from a fraction of one per cent by weight to 90% by weight or more, if desired. The preferred composition includes 1 to 5% by weight of copper, and 10 to 60% by weight of one or more of the rare earth materials previously described. I prefer to impregnate a suitable supporting material such as pumice, silica gel, diatomaceous earth, fire clay and the like, with a mixture of the copper and rare earth compounds, although a supporting material is not absolutely necessary for the successful operation of the method.

In carrying out the method, I may utilize any suitable apparatus designed to permit operation with periodical reversal of the direction of flow of the gaseous mixture of hydrogen chloride and oxygen or air through a tube containing the catalyst. Such an apparatus is illustrated diagrammatically in Fig. 3, in which 5 indicates a catalyst tube containing the catalyst 6. The tube 5 is surrounded by heat exchangers 7, 8 and 9 designed to permit the addition of heat as the gaseous mixture enters and travels through the catalyst body, and the abstraction of heat as it leaves the catalyst body. The heat of a gas flame may be utilized for the introduction of heat to the catalyst body, and any suitable cooling means may be employed for abstracting heat. As the flow of gas is reversed, the sections 7 and 9 may be either heating or cooling sections. The gaseous mixture passing through the catalyst body will carry with it some volatile portion of the catalyst from the reaction zone. The purpose of cooling the gaseous mixture before it leaves the catalyst body is to condense and retain such volatile portion, which becomes effective again when the direction of flow of the gaseous mixture is reversed.

At each end, the tube 5 is connected to pipes 10 and 11 having valves 12 therein to control the flow of gaseous mixture therethrough. An inlet pipe 13 is connected to the pipe 10, and an outlet pipe 14 is connected to the pipe 11. The inlet pipe may be connected to any suitable source of a mixture of hydrogen chloride with oxygen or air, and the outlet pipe 14 may be connected to any suitable apparatus wherein the chlorine produced by the operation is separated and condensed or otherwise utilized.

During the operation, the incoming gaseous mixture may be directed downwardly through the body of catalyst 6 by proper adjustment of the valves, and thence to the outlet, until a deficiency of the active catalyst is found in the reaction zone. At this time, the valves are reversed so as to permit the gaseous mixture to pass upwardly through the catalyst body 6. At the same time, the heating and cooling functions of the sections 7 and 9 are reversed. Volatile material which has condensed in the catalyst section which is subject to cooling becomes active as the result of the application of heat, and the portion thereof which is volatilized is in turn condensed in the section which is subject to cooling. Thus the active material, in so far as it is volatile, travels forwardly and backwardly through the body of catalyst and serves its intended purpose without escaping in any substantial amount with the reaction products. Thus, in addition to the added efficiency of the catalyst material, depending upon the combination of copper and rare earth compounds, the activity is preserved in the continuous operation of the method.

The following examples give the results obtained under strictly comparable conditions when mixtures of HCl and $O_2$ are contacted with a variety of catalysts. The volume of catalyst used in all cases was 50 cc. charged into a ⅞" inside diameter quartz tube at a temperature of 450° to 460° C. Commercial oxygen was fed to the tube at a rate of 0.88 cubic foot per hour in all cases, and this was mixed with HCl gas which was fed to the tube at a rate varying between about 0.5 and 4.2 cubic feet per hour.

Example #1 shows the results obtained with a newly prepared catalyst composed of pumice impregnated with copper chloride so that it contained 2.5% by weight copper.

Example #2 gives the results obtained with a newly prepared catalyst composed of pumice impregnated with 55.5% by weight of rare earth oxides.

Example #3 gives the results obtained with a newly prepared catalyst composed of pumice impregnated with a mixture of copper chloride and rare earth oxides so that it contained 2.5% by weight copper and 55.5% by weight rare earth oxides.

EXAMPLE #1

Catalyst 2.5% Cu on pumice

| Cu. ft. HCl/hr. | Cu. ft. $O_2$/hr. | Percent conversion | Gms. $Cl_2$/hr. |
|---|---|---|---|
| 0.59 | 0.88 | 79 | 21 |
| 1.51 | 0.88 | 46 | 31 |
| 2.24 | 0.88 | 32 | 32 |
| 2.92 | 0.88 | 23 | 30 |
| 4.19 | 0.88 | 17 | 32 |

EXAMPLE #2

Catalyst 55.5% rare earth oxides on pumice

| Cu. ft. HCl/hr. | Cu. ft. $O_2$/hr. | Percent conversion | Gms. $Cl_2$/hr. |
|---|---|---|---|
| 0.55 | 0.88 | 8.4 | 2.7 |
| 0.82 | 0.88 | 4.7 | 1.7 |
| 1.23 | 0.88 | 2.5 | 1.4 |
| 1.51 | 0.88 | 1.9 | 1.3 |

Example #3

Catalyst 2.5% Cu+55.5% rare earth oxides on pumice

| Cu. ft. HCl/hr. | Cu. ft. O₂/hr. | Percent conversion | Gms. Cl₂/hr. |
|---|---|---|---|
| 0.58 | 0.88 | 82 | 21 |
| 1.50 | 0.88 | 78 | 53 |
| 2.33 | 0.88 | 73 | 76 |
| 3.98 | 0.88 | 60 | 108 |

The results given in the above examples are shown graphically in Fig. 1. Curves 1, 2 and 3 are obtained by plotting the grams chlorine produced per hour against the cubic feet HCl fed to the tube per hour using the data given in the corresponding examples.

It is seen that under comparable conditions the chlorine produced per hour by my improved catalyst, used in Example 3, is about three times as great as can be obtained with copper chloride alone, under conditions favorable for large production, and about 8 to 40 times as great as the production obtained with rare earth oxides alone under comparable conditions. It is quite probable that the high conversion reported by Ditz and Margosches was obtained with extremely low space velocities which would make the process very costly and uneconomical.

Another important difference between my improved catalyst and the copper chloride catalyst previously used in the Deacon process is the evident fact that under conditions favorable for the production of commercial quantities of chlorine a much greater conversion per pass of the entering hydrogen chloride is obtained. This facilitates greatly the complete utilization of the raw material supplied to the process.

As evidence of the longer useful life obtained by the use of my improved catalyst, Examples #4, 5 and 6 are given. Here again a 50 cc. volume of catalyst was used in a ⅞" inside diameter quartz tube heated to 450 to 460° C. In all cases, the HCl feed was maintained at approximately 0.6 cu. ft. per hour, and air was fed at the rate of 2.27 cu. ft. per hour.

Example #4

Catalyst 2.5% Cu on pumice

| Hours of operation | Percent conversion | Grams Cl₂/hr. |
|---|---|---|
| 1 | 56 | 15.1 |
| 4 | 51 | 14.6 |
| 21 | 45 | 12.4 |
| 45 | 38 | 10.5 |
| 51 | 37 | 10.2 |
| 70 | 28 | 7.7 |
| 96 | 27 | 7.9 |
| 119 | 29 | 7.8 |
| 165 | 23 | 6.3 |

Example #5

Catalyst 2.5% Cu+5% Ce+13% Th on pumice

| Hours of operation | Percent conversion | Grams Cl₂/hr. |
|---|---|---|
| 1 | 77 | 20.7 |
| 22 | 74 | 20.5 |
| 47 | 70 | 19.1 |
| 71 | 65 | 17.8 |
| 95 | 62 | 17.5 |
| 118 | 60 | 16.9 |
| 146 | 53 | 14.7 |
| 170 | 53 | 14.8 |

Example #6

Catalyst 2.5% Cu+9.8% Ce+26.8% Th on pumice

| Hours of operation | Percent conversion | Grams Cl₂/hr. |
|---|---|---|
| 3 | 72 | 20.9 |
| 24 | 72 | 20.4 |
| 48 | 73 | 20.3 |
| 72 | 72 | 19.7 |
| 98 | 63 | 17.7 |
| 121 | 64 | 18.5 |
| 139 | 61 | 17.5 |

The results given in Examples 4, 5 and 6 are shown graphically in Fig. 2. Curves 4, 5 and 6 are obtained by plotting the production in grams per hour against the time of operation in hours using the data given in the corresponding examples.

It is seen that the production in grams obtained with a catalyst made by impregnating pumice with copper chloride was originally 15.1 grams per hour but at the end of 165 hours operation produced only about 42 per cent of that amount. Under comparable conditions the catalyst prepared by impregnating pumice with an equal quantity of copper compound together with cerium and thorium compounds not only produced a larger amount of chlorine, but at the end of 170 hours of operation was still producing 72% of the larger amount, so that after this period of operation its production was more than double the production of a like quantity of the copper chloride catalyst after a similar period of operation. The effect of adding a larger amount of rare earth oxides is made evident by comparing the results of Example 6 with those of Example 5. In Example 6, the amounts of cerium and thorium used in conjunction with copper chloride are about double the amounts used in Example 5. Under Example 6 at the end of about 140 hours of operation, production had fallen to about 84% of its original value, a loss of only 16%, whereas a loss of 28% was found in Example 5, over a comparable period of operation. At the end of about 140 hours of operation the catalyst of Example 6 was producing 2½ times the chlorine production of the copper chloride catalyst at the end of a comparable period of operation.

I have operated a charge of catalyst similar in composition to the ones used in Examples 3, 5 and 6 in the manner described above, with reversal of the direction of flow on the average of once every 24 hours, for a period of 92 days without any perceptible loss in activity. During this period of operation many hundreds of grams of chlorine per gram of catalyst charged were produced. This may well be contrasted with the results obtained by the Deacon process using a copper chloride catalyst. The copper chloride catalyst used in the Deacon process invariably lost a large part of its original activity before any such amount of chlorine was produced.

This illustrates the extent to which the difficulties inherent in the Deacon process may be overcome by the use of my improved catalyst, in so far as its activity and long useful life affect the size of apparatus and the quantity of catalyst required to produce commercial quantities of chlorine.

There are other important advantages in the use of my improved catalyst. Because of its unusually high activity, conditions of operation may be chosen under which very high conversions of the entering HCl gas are obtained. This may at times be very desirable in order to facilitate complete utilization of this raw material. To accomplish this, air or oxygen in considerable excess is used. Under these conditions the exit gas leaving the apparatus may contain up to 15 to 20% by volume of chlorine after removal of unreacted HCl and steam, if air is used, or 30 to 60% by volume of chlorine if oxygen is used.

If, on the other hand, the highest possible concentration of chlorine is desired in the exit gas after removal of unreacted HCl, HCl is added in considerable excess, so as to obtain the highest possible consumption of the oxygen in the entering gases. Under these conditions 25 to 32% by volume of chlorine may be obtained if air is used, and 90 to 98% by volume of chlorine when oxygen is used.

Examples 7 to 10 show the manner in which the ratio of HCl to air, and other operating conditions may be varied to give the kind of product desired.

|  | Example No.— | | | |
|---|---|---|---|---|
|  | 7 | 8 | 9 | 10 |
| Tube diameter, inches | 2 | 2 | ⅞ | ⅞ |
| Catalyst volume cc | 500 | 500 | 50 | 50 |
| Catalyst composition: | | | | |
| Percent Cu | 2.5 | 2.5 | 2.5 | 2.5 |
| Percent rare earth oxides | 55.5 | 55.5 | 40.6 | 40.6 |
| Temperature, °C | 490–510 | 480–510 | 460 | 460 |
| HCl feed cu. ft./hr | 7.5 | 9.9 | 2.4 | 2.46 |
| Air feed cu. ft./hr | 30.5 | 30.5 | 2.3 | 1.14 |
| HCl conversion, percent | 79.8 | 79.3 | 61.5 | 36.2 |
| Production grams per hr | 238 | 313 | 66.8 | 39.8 |
| Cl₂ in exit gas percent by vol | 9.1 | 11.8 | 28.2 | 32.3 |

Examples 7 and 8 show under what conditions relatively high conversion of the entering HCl may be obtained. Under these conditions a fairly large excess of air is employed. By reducing the proportion of air in the entering gases as in Examples 9 and 10 a product richer in chlorine may be obtained with a greater production per unit volume of catalyst but at a sacrifice in conversion.

When the oxidation is carried out with my improved catalyst using pure oxygen in place of air, the results obtained are remarkable. Some results obtained with oxygen are given in Examples 11 to 14.

|  | Example No.— | | | |
|---|---|---|---|---|
|  | 11 | 12 | 13 | 14 |
| Tube diameter, inches | ⅞ | ⅞ | 2" | ⅞ |
| Catalyst volume cc | 100 | 100 | 500 | 150 |
| Catalyst composition: | | | | |
| Percent Cu | 2.5 | 2.5 | 2.5 | 2.5 |
| Percent rare earths | {5.0 Ce / 13.5 Th} | 5.0 Ce / 13.5 Th | 55.5* | 5.0 Ce / 13.5 Th |
| Temperature, °C | 463 | 435–445 | 518 | 480 |
| HCl feed cu. ft./hr | 1.13 | 1.60 | 40.3 | 1.14 |
| O₂ feed cu. ft./hr | 1.40 | 1.40 | 7.0 | 0.076 |
| HCl conversion, percent | 96 | 94 | 45–50 | 25.0 |
| Production grms./hr | 48.6 | 70.6 | 806 | 12.8 |
| Cl₂ in exit gas percent by vol | 32.0 | 44.0 | 80–90 | 96.8 |

*Percent of rare earths is given as percent of mixed rare earth oxides.

Examples 11 and 12 show operating conditions that give very high conversion of the entering HCl, and a concentration of chlorine in the exit gas equal to, or somewhat greater than, the highest concentration obtainable when air is used with very much lower conversion of the entering HCl.

Examples 13 and 14 show the results obtained with oxygen when a substantial excess of HCl is used in the entering gas. Under these conditions practically complete consumption of the oxygen is obtained so that after removal of unreacted HCl and steam from the gaseous product, substantially pure chlorine may be obtained. The importance of this result will be appreciated when it is pointed out that such a product is readily compressed into tanks and can be transported or utilized directly as liquid chlorine. To my knowledge, this never before has been accomplished with chlorine produced by the direct oxidation of hydrogen chloride.

From the results shown in Examples 7 to 14 it is evident that conditions of operation may be chosen that will give any desired concentration of chlorine in the gaseous product obtained with my improved catalyst, and that it may be obtained at such a rate as to be readily adapted to the production of commercial quantities of chlorine.

With a copper chloride catalyst the complete consumption of oxygen is out of the question commercially because of the inability of this catalyst to operate effectively in the presence of excess HCl. Reference to Example 1 shows clearly the extent to which excess HCl suppresses the activity of the copper chloride catalyst; from this it is evident that a high concentration of chlorine cannot be obtained with such a catalyst.

I have also found that the present catalyst may be operated advantageously when the entering gases contain substantial quantities of water vapor. Under these conditions, the production of chlorine is retarded slightly but the retarding effect of water vapor on the activity of my improved catalyst is small compared to its effect on the activity of previously known catalysts. With my improved catalyst, aqueous hydrochloric acid can be used as starting material in place of the dry gas produced by the action of sulphuric acid on alkali chlorides, and due allowance can be made for the retarding action of the water vapor in the design of the plant, so that satisfactory production may proceed. In this case, the production of chlorine would not be attended by the simultaneous accumulation of any byproduct. This method of operation is particularly desirable in locations where the chlorine after production and utilization can be recovered in the form of an aqueous solution of hydrochloric acid.

The importance of providing a catalyst that will operate effectively with such a wide variety of combinations of entering gases can scarcely be exaggerated. However, it is also important from the standpoint of equipment design that the catalyst operate over a wide range of temperatures. While I prefer to operate with a reaction temperature in the vicinity of 425 to 600° C., I have obtained good results at temperatures as low as 300 to 350° C. and also at temperatures as high as 650 to 800° C. and higher.

The catalyst may be prepared in a variety of ways such as by precipitation of the metals as the hydroxides on to a suitable supporting material such as pumice, silica gel, diatomaceous earth or other porous material that will withstand the effect of elevated temperatures and exposure to chlorine, hydrogen chloride, oxygen and steam. An alternative method is the soaking of the supporting material in a solution of salts of the appropriate metals, for example the chlorides or nitrates of the metals with subsequent drying before use. Again, the support may be impregnated with the mixed salts or oxides of the desired metals with the subsequent addition, with stirring, of water, or a solution of ammonia, sodium or potassium hydroxides, or other alkaline solution, after which the resulting mixture is dried and heated to the reaction temperature before use.

If desired, the catalyst may be prepared by precipitating the metals as hydroxides with sodium or potassium hydroxide as the precipitating agent, or the oxides or other materials desired as the catalyst may be thoroughly mixed and pressed into pellets for use.

The several examples demonstrate clearly the increased effectiveness of my catalyst and the advantages resulting from the use thereof in respect to the successful and economic commercial operation of the process to produce free chlorine.

It is obvious from the results above described that I have produced a catalyst which makes it possible to oxidize hydrogen chloride efficiently and economically and to employ either anhydrous or aqueous hydrogen chloride for the purpose. This is particularly desirable in many present-day operations where hydrogen chloride is formed as a byproduct, resulting from the use of chlorine, such for example as in the chlorination of hydrocarbons. Furthermore, the operation of the method herein disclosed will produce chlorine in any desired concentration and at the same time avoids the production of undesirable byproducts, such as caustic alkali, and the problem of disposing of such byproducts.

The term "oxygen" in the accompanying claims is used to include oxygen and oxygen-containing gases. The term "rare earth group" includes the metals defined as included in the group in the specification.

Various changes may be made in the form and arrangement of the apparatus, the details of procedure, and particularly in the composition of the catalyst, within the limits of the appended claims, without departing from the invention or sacrificing any of the advantages thereof.

I claim:

1. The method of producing chlorine by oxidation of hydrogen chloride which comprises introducing a gaseous mixture of hydrogen chloride and oxygen to a catalyst heated to an elevated temperature and containing a compound of copper and a compound of a metal selected from the group consisting of uranium and metals of the "rare earth group."

2. The method of producing chlorine by oxidation of hydrogen chloride which comprises introducing a gaseous mixture of hydrogen chloride and oxygen to a catalyst heated to an elevated temperature and comprising a carrier supporting a compound of copper and a compound of a metal selected from the group consisting of uranium and metals of the "rare earth group."

3. The method of producing chlorine by oxidation of hydrogen chloride which comprises introducing a gaseous mixture of hydrogen chloride and oxygen to a catalyst heated to an elevated temperature and containing a compound of copper and a compound of a metal selected from the group consisting of uranium and metals of the "rare earth group," cooling the catalyst at the discharge end and periodically reversing the direction of flow of the gaseous mixture.

4. The method of producing chlorine by oxidation of hydrogen chloride which comprises introducing a gaseous mixture of hydrogen chloride and oxygen to a catalyst containing a compound of copper and a compound of a metal selected from the group consisting of uranium and metals of the "rare earth group," heating the catalyst at the feeding, cooling the catalyst at the discharge end and periodically reversing the direction of flow of the gaseous mixture.

5. The method of producing chlorine by oxidation of hydrogen chloride which comprises introducing a gaseous mixture of hydrogen chloride, water vapor and oxygen to a catalyst heated to an elevated temperature and containing a compound of copper and a compound of a metal selected from the group consisting of uranium and metals of the "rare earth group."

6. The method of producing chlorine by oxidation of hydrogen chloride which comprises introducing a gaseous mixture of hydrogen chloride, water vapor and oxygen to a catalyst heated to an elevated temperature and comprising a carrier supporting a compound of copper and a compound of a metal selected from the group consisting of uranium and metals of the "rare earth group."

7. The method of producing chlorine by oxidation of hydrogen chloride which comprises introducing a gaseous mixture of hydrogen chloride, water vapor and oxygen to a catalyst heated to an elevated temperature and containing a compound of copper and a compound of a metal selected from the group consisting of uranium and metals of the "rare earth group," cooling the catalyst at the discharge end and periodically reversing the direction of flow of the gaseous mixture.

8. The method of producing chlorine by oxidation of hydrogen chloride which comprises introducing a gaseous mixture of hydrogen chloride, water vapor and oxygen to a catalyst containing a compound of copper and a compound of a metal selected from the group consisting of uranium and metals of the "rare earth group," heating the catalyst at the feding, cooling the catalyst at the discharge end and periodically reversing the direction of flow of the gaseous mixture.

HOKE S. MILLER.